(12) United States Patent
Braun et al.

(10) Patent No.: US 7,145,293 B2
(45) Date of Patent: Dec. 5, 2006

(54) ELECTRONIC BALLAST HAVING RESONANCE EXCITATION FOR GENERATING A TRANSFER VOLTAGE

(75) Inventors: Alois Braun, Neuburg (DE); Young G. Kang, Vernon Hills, IL (US); Walter Limmer, Munich (DE); Joachim Muhlschlegel, Grobenzell (DE)

(73) Assignee: Patent-Treuhand-Gesellschaft fur Elektrisch Gluhlampen mbH (DE)

( * ) Notice: Subject to any disclaimer, the term of this patent is extended or adjusted under 35 U.S.C. 154(b) by 0 days.

(21) Appl. No.: 11/101,390

(22) Filed: Apr. 8, 2005

(65) Prior Publication Data

US 2005/0225260 A1    Oct. 13, 2005

(30) Foreign Application Priority Data

Apr. 8, 2004    (DE) ............ 10 2004 017 479

(51) Int. Cl.
*H05B 41/36*    (2006.01)
*H05B 37/02*    (2006.01)

(52) U.S. Cl. ................ 315/224; 315/291
(58) Field of Classification Search ........ 315/209, 315/224–225, 244, 247, 291, 307
See application file for complete search history.

(56) References Cited

U.S. PATENT DOCUMENTS

| | | | |
|---|---|---|---|
| 5,426,350 A | 6/1995 | Lai | 315/244 |
| 5,623,187 A | 4/1997 | Caldeira et al. | 315/307 |
| 5,686,798 A * | 11/1997 | Mattas | 315/244 |
| 5,771,159 A * | 6/1998 | Sako et al. | 363/17 |
| 5,932,976 A * | 8/1999 | Maheshwari et al. | 315/291 |
| 6,414,448 B1 * | 7/2002 | Noone et al. | 315/291 |
| 6,459,214 B1 * | 10/2002 | Chen et al. | 315/247 |
| 6,459,215 B1 * | 10/2002 | Nerone et al. | 315/291 |
| 6,518,712 B1 * | 2/2003 | Weng | 315/209 R |
| 2004/0245942 A1 * | 12/2004 | Mayer et al. | 315/291 |
| 2005/0122057 A1 * | 6/2005 | Chen et al. | 315/224 |

FOREIGN PATENT DOCUMENTS

DE      10210629 A1   9/2003
WO   WO 2004/064457 A1   7/2004

OTHER PUBLICATIONS

Copy of European Patent Office Search Report (dated Jul. 11, 2005; 3 pages total) for related European Patent Application No. 05004714.

* cited by examiner

*Primary Examiner*—Don Wong
*Assistant Examiner*—Hung Tran Vy
(74) *Attorney, Agent, or Firm*—Fitch, Even, Tabin & Flannery

(57) ABSTRACT

The invention relates to an electronic ballast, to an illumination device including the electronic ballast and an associated high-pressure discharge lamp, and to a corresponding operating method for a high-pressure discharge lamp, in which resonance excitation is used to generate a voltage-increased power for a transfer phase of the lamp Lp after starting.

6 Claims, 2 Drawing Sheets

ELECTRONIC BALLAST HAVING RESONANCE EXCITATION FOR GENERATING A TRANSFER VOLTAGE

FIELD OF THE INVENTION

This invention relates to electronic ballasts and to operating methods for high-pressure discharge lamps.

BACKGROUND OF THE INVENTION

It is known per se to operate high-pressure discharge lamps using electronic ballasts, which have converters having one or a plurality of switching transistors. Full-bridge converters are common. During continuous operation of the lamp, these converters generate DC voltage supply powers for the lamp which, in simple terms, alternate at a low frequency in terms of their polarity. In this case, disruptive phenomena occurring in the event of real and thus asymmetrical DC operation are prevented in the lamp, and, at the same time, disruptive higher frequencies are likewise kept largely remote from the lamp.

It is necessary, in particular, to filter out or to limit remaining so-called ripple current components in the supply power for the lamp using filter capacitors. Reference is made below in this context to a filter capacitor, although variants using a plurality of filter capacitors may also be intended.

When high-pressure discharge lamps are started, a starting voltage of a considerable level must be made available, for example in a range from 1.5 kV to 5 kV (simple amplitude). The started lamp requires a so-called transfer voltage for a certain transition time, and this transfer voltage is greater than the required voltage of the continuous-operation supply power.

SUMMARY OF THE INVENTION

The invention is based on the technical problem of specifying an electronic ballast for operating a high-pressure discharge lamp and a corresponding operating method, in which the transfer voltage can be generated in a favorable manner.

The invention first relates to an electronic ballast for operating a high-pressure discharge lamp having a converter having at least one switching transistor for the purpose of generating a supply power for continuous operation of the lamp by means of a switching operation of the switching transistor, and having a filter capacitor for the purpose of filtering ripple interference in the supply power for the lamp, characterized by a resonant circuit, which contains the filter capacitor, and in that the ballast is designed to excite a resonance in the resonant circuit by means of radiofrequency operation of the switching transistor of the converter, in order thus to generate a power for the lamp, which has a greater voltage than the continuous-operation supply power, during a transfer phase following starting, and to a corresponding illumination device having such a ballast and an appropriate high-pressure discharge lamp and, finally, to a corresponding operating method for operating a high-pressure discharge lamp.

Preferred refinements are specified in the dependent claims.

The basic idea of the invention consists in generating the transfer voltage by means of resonance excitation and, in the process, using the filter capacitor as the capacitive element in a resonant circuit, this filter capacitor being provided in any case for filtering out the ripple current components. The excitation of the resonant circuit is intended to take place by means of the same converter which is used to provide the continuous operation of the lamp. The intention is thus to make as much use as possible of components of the circuit which are provided in any case. In particular, the switching operation of the switching transistor or the switching transistors, which are also used for the continuous operation, is intended to be used for resonance excitation.

Overall, the invention thus has the advantage of generating the increased transfer voltages required with little complexity, without for this reason the need to considerably increase the so-called intermediate circuit voltage with which the converter is generally supplied.

A lamp inductor or step-down inductor which is provided in any case for other reasons is preferably used as the inductive element in the resonant circuit. Such an inductor is firstly necessary owing to the differential impedance of high-pressure discharge lamps which is in many cases partially negative and/or secondly owing to the step-down converter operation which will be explained below. In this case, no other elements are preferably provided in the resonant circuit as elements which are actually contributing to the resonance, it naturally being possible for the filter capacitor and the lamp inductor to be of multi-part design, as has already been mentioned earlier for the filter capacitor.

One preferred refinement of the invention is based on a half-bridge having two switching transistors as the converter, as is illustrated by the exemplary embodiment. In particular, this half-bridge may be operated during continuous operation of the lamp such that, on the one hand, it operates as a low-frequency inverter for the "symmetrization", already described at the outset, of the lamp operation by means of sign inversion. On the other hand, the lamp operation may in this case also take place at a voltage which is reduced compared to the intermediate circuit voltage, for which purpose the half-bridge with the respectively conductive switching transistor reduces the intermediate circuit voltage within a half-cycle of the inverter operation in a similar manner to a step-down converter. This step-down converter operation of the switching transistors in the half bridge may be integrated in a lamp current regulation system.

The resonance excitation which is characteristic of the invention preferably takes place at a frequency below the resonant frequency of the resonant circuit. When using magnification factors in electronic ballasts for lamps, resonant frequencies are approached, in a conventional manner, from above. In the present case, this is intended to take place in reverse fashion. This has advantages for the following reasons: Good filtering action of the filter capacitor brings about a certain minimum capacitance for the filter capacitor. On the other hand, the lamp inductor or another resonant inductor should not be unnecessarily large for cost and space reasons. If, owing to the charge-reversal processes, saturation of the inductor results during resonance excitation, its inductance would be altered, and the resonant circuit would automatically increase its resonant frequency. In the case of an approach from higher frequencies, this would result in an unstable state and in considerable component loading. In order to be able to control such unstable conditions, relatively rapid controllers and relatively rapid voltage or current measurements are required. The invention circumvents this problem by means of an approach from low frequencies.

In this case, this means the fundamental frequency of the resonance excitation. Since the excitation will generally not take place with purely sinusoidal functions but with more or less square-wave functions, Fourier components at frequencies above the resonant frequency can naturally occur. However, these have correspondingly low amplitudes.

A preferred value for the excitation frequency should, if possible, not be over 0.9 times the resonant frequency. On the other hand, it may be advantageous if the excitation frequency, although in many cases a magnification factor which is too high is not required for generating a sufficient transfer voltage, is not below 0.4 times the resonant frequency. The reason for this is the fact that the square-wave functions have a severe harmonic with three times the fundamental frequency, which come close to the resonant frequency at fundamental frequencies below 0.4 times the resonant frequency. Favorable are values between 0.4 and 0.6 times the resonant frequency. However, in the context of this invention, it is also thoroughly possible to operate at relatively low excitation frequencies which are markedly below 0.4 times the resonant frequency. In this case, the voltage increase is to be understood as a step response, i.e. it takes place to a certain extent mainly owing to the harmonic components of the excitation step. (However, excitation step is in this case not intended to mean a single excitation but is merely intended to mean the fact that the frequency is markedly lower than the resonant frequency.)

The amplitude of the resonance excitation can also be controlled according to the invention by almost an average amplitude reduction being achieved, similarly to the step-down converter operation during continuous operation of the lamp, during a conductive switching phase of the or of a switching transistor by repeated disconnection ("chopping") at a frequency which is markedly higher than the resonant frequency. In addition or as alternative, the time duration of the switch-on phase of the switching transistor may also be limited overall and may be considerably less than half a time component.

It has already been mentioned that the filter capacitor is intended to have a certain minimum capacitance in favor of a good filter action. Values of more than 1 nF/watt of lamp power, in particular of more than 1.2 or 1.3 nF/watt, are preferred. In the case of a plurality of capacitors, this naturally also applies to the effective total capacitance.

The voltage increases occurring should preferably lead to amplitudes in the range of up to 800 V (simple amplitude). That is to say, it is preferred in particular to use the magnification factor according to the invention only to generate the transfer voltage and not the starting voltage. If the magnification factor were to be used also to generate the starting voltage, considerably higher currents would result and the frequency would come considerably closer to the resonant frequency. Disadvantageous effects for the permitted capacitance of the filter capacitor, which acts as a resonant capacitor, and/or for the dimensioning of the inductor thus result. Since the aim is, however, to operate with a sufficiently large filter capacitor, on the one hand, and with a lamp inductor or another resonant inductor which is not too large, on the other hand, the starting voltage itself is preferably generated by a dedicated starting circuit. The starting circuit may be, in particular, a starting circuit known per se having a starting capacitor, whose discharge, if necessary having been transformed up, leads to starting.

BRIEF DESCRIPTION OF THE DRAWINGS

The invention will be explained in more detail below with reference to an exemplary embodiment. The individual features illustrated here may also be essential to the invention in other combinations. In particular, the description above and below always relates both to the apparatus aspect and to the method aspect of the invention. In the drawing.

DETAILED DESCRIPTION OF THE INVENTION

Figure 1:
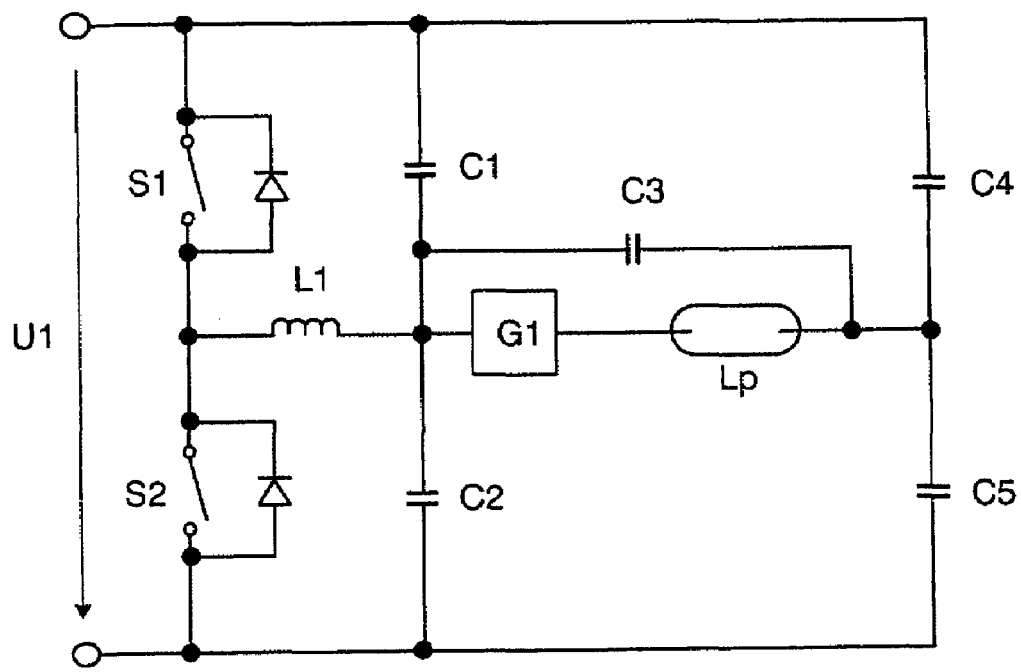
FIG. 1 shows a schematic circuit diagram of a ballast according to the invention.

FIG. 1 shows a half-bridge topology known per se having two switching transistors $S_1$ and $S_2$. Said switching transistors $S_1$ and $S_2$ lie in series between two supply branches, between which an intermediate circuit voltage $U_1$ is applied. The intermediate circuit voltage $U_1$ can be generated by rectifying a system voltage with corresponding filtering and, possibly, power factor correction.

By means of an alternating switching operation of the half-bridge transistors $S_1$ and $S_2$, a center tap between them is switched to and fro between the potentials of the supply branches. Correspondingly, a radiofrequency AC potential corresponding to this switching operation is applied to the left-hand connection of an inductor $L_1$ illustrated in FIG. 1. The inductor $L_1$ is in series with a high-pressure discharge lamp Lp, a block $G_1$ connected therebetween representing a starting circuit known per se. Said starting circuit generates a starting pulse for starting the lamp Lp by means of capacitor discharge and upward transformation in a manner which is of no more interest to the invention. The right-hand connection of the lamp Lp is connected to the two supply branches via two coupling capacitors $C_4$ and $C_5$. The coupling capacitors $C_4$ and $C_5$ ensure that the right-hand connection of the lamp Lp has a potential in the center between the potentials of the supply branches. The circuit is thus able to generate half the intermediate circuit voltage via the lamp Lp. A filter capacitor $C_3$ lies in parallel with the lamp Lp. A tap between the lamp inductor $L_1$ and the starting circuit $G_1$ is connected in each case to the supply branches via two filter capacitors $C_1$ and $C_2$.

During actual operation of a high-pressure discharge lamp, an operating voltage of an order of magnitude of 80 V–150 V is required which is actually less than half the intermediate circuit voltages which are generally available. In this case, during a switching phase in which, for example, the half-bridge transistor $S_1$ is conductive, said half-bridge transistor S1 is thus interrupted in a clocked manner in order to generate, together with the inductor $L_1$, a step-down converter operation during this switching phase. As a result, a desired lamp operating voltage can be set by means of the step-down converter operation.

On the other hand, a high-pressure discharge lamp requires, for the transition from a glow discharge, which follows on from the actual starting, to the arc discharge, a certain period of time in which a transfer voltage, which is markedly higher than the operating voltage, in the range of, typically, 260 V–330 V needs to be provided. This value is generally above half the intermediate circuit voltage. The half-bridge combined with the step-down converter cannot generate this voltage without difficulty.

According to the invention, a resonance of a lamp resonant circuit, which comprises the capacitors $C_1$–$C_3$ and the inductor $L_1$, is excited during the transfer phase. As a result, a voltage increase is induced, by means of which the desired transfer voltage can be generated. According to the invention, this resonance excitation is, however, only used for the transfer voltage and not for the starting voltage, with the result that the filter capacitors can have a desired size of, typically, 50 nF in the case of a ballast for a 35 W lamp or 100 nF in the case of a ballast for a 70 W lamp, and corresponding capacitances for other lamp powers. In fact, this desired size is the effective total capacitance of the capacitors $C_1$ to $C_3$. If, with this effective filter capacitance, resonance starting were to take place, considerable currents would be produced as a result of the starting voltages required of an order of magnitude of 1.5 kV–5 kV together with said capacitance. The inductor $L_1$ would correspondingly have to be provided with very large dimensions in order to be able to absorb the energy correlating therewith. (This energy is proportional to the filter capacitance and the square of the voltage.)

Such dimensions for the inductor are regarded as unfavorable in accordance with the invention as regards physical size and costs.

Although there is the possible solution of an increase in the intermediate circuit voltage, this is associated with disadvantages owing to the dimensions of the components of the half-bridge and a possible power factor correction circuit and also in terms of efficiency.

Said resonance excitation for the purpose of generating the transfer voltage takes place according to the invention at lower frequencies than the resonant frequency of the lamp resonant circuit, in this exemplary embodiment approximately at half the resonant frequency, to be precise at 0.55 times the resonant frequency. Only moderate voltage increases thus result, which are, however, fully sufficient for the transfer phase. In particular, the position of the frequency below the resonant frequency ensures that no fundamental instabilities occur given any unintentional saturation occurrences or other fluctuations. In particular, it is thus possible to avoid a rapid controller and a rapid voltage or current measurement at the lamp resonant circuit.

Figure 2:
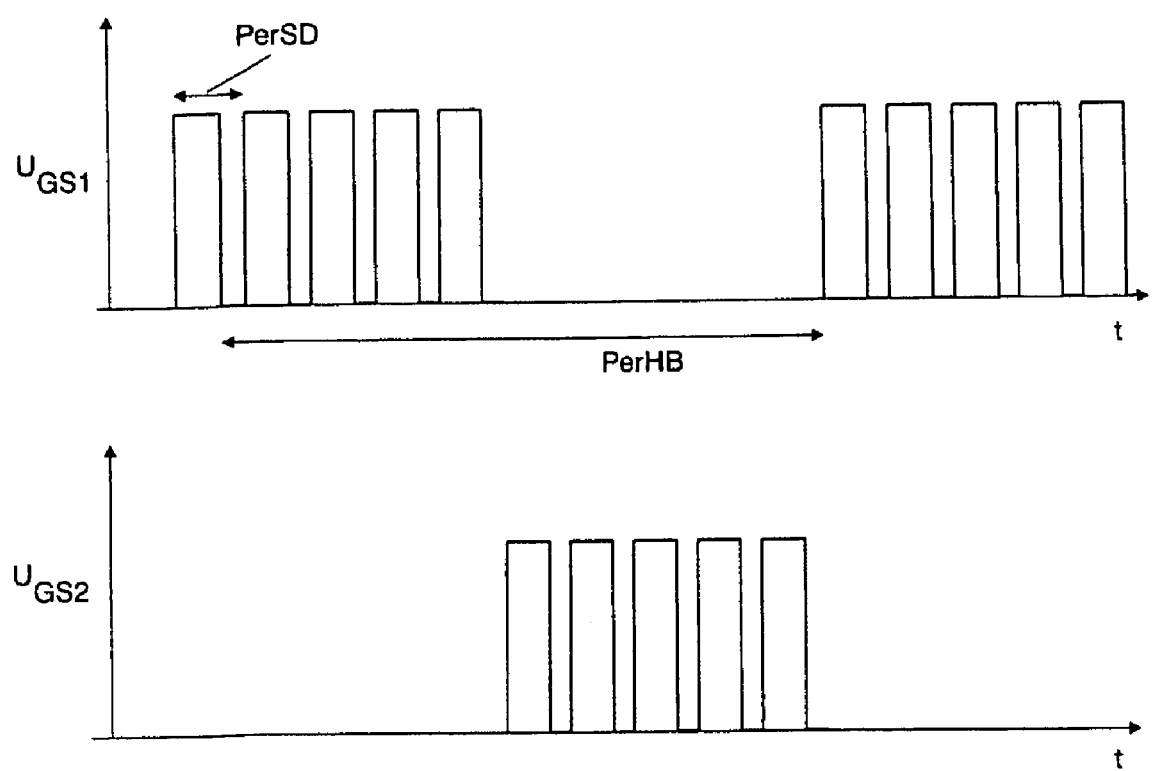
FIG. 2 shows schematic timing diagrams for the purpose of illustrating the clocking of transistors of the ballast shown in FIG. 1.

FIG. 2 shows a schematic illustration of the clocking of the switching operation of the two transistors $S_1$ and $S_2$ shown in FIG. 1. The upper part represents the upper transistor $S_1$ (UGS1), and the lower part represents the lower transistor $S_2$ (UGS2). It can be seen that in this case two cycles occur, to be precise firstly a longer cycle between the pulse packets (PerHB) and secondly a shorter cycle within the pulse packets (PerSD). In terms of quality, this corresponds to the combination already described comprising step-down converter operation and half-bridge operation, the short cycle representing the step-down converter operation and the longer cycle representing the half-bridge operation.

However, of concern here is the operation during the transfer phase. The longer cycle in this case represents near-resonance excitation at approximately 0.55 times the resonant frequency. Within the corresponding conductive phase, represented by the high level of the gate voltage of the corresponding transistor, "chopping", i.e. modulation with the shorter cycle duration, takes place. This is markedly above the resonant frequency, but could in certain cases also be less than the resonant frequency. It is only necessary to avoid coming too close to the resonant frequency. With "chopping", the effective amplitude of the square-wave excitation can be reduced to a certain extent at 0.55 times the resonant frequency. Owing to "chopping" at a markedly higher frequency, only the average value is relevant to a certain extent for the resonant circuit. An addition or alternative would otherwise consist in shortening the switch-on phases with respect to half the time component, i.e. to a certain extent to set the "chopper pulses" synchronously at the start or the end of a conductive phase.

Figure 3:
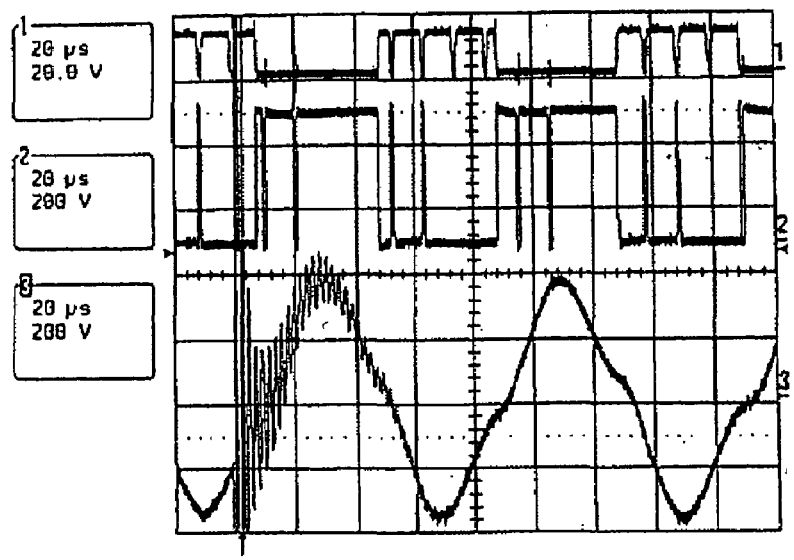
FIG. 3 shows measurement graphs for the operation of the ballast shown in FIG. 1 with the clocking shown in FIG. 2.

FIG. 3 shows a real graph relating to the ballast circuit shown in FIG. 1. The uppermost waveform at channel 1 shows the gate voltage of the lower half-bridge transistor $S_2$, the central waveform at channel 2 shows the potential of the half-bridge center point, and the lower waveform at channel 3 shows the voltage across the lamp.

The marked excursion of the lamp voltage approximately at the end of the first box from the left shows starting of the lamp with the aid of the starting circuit $G_1$. The radiofrequency resonance excited thereby is of no further interest for the invention and has to do with stray inductances in the starting circuit $G_1$ in connection with specific capacitances. However, it can be seen that the "chopped" square-wave switching operation (illustrated by FIG. 2) of the half-bridge transistor is already present prior to starting. Here, although no starting takes place and, as a result, there is also no transfer, there is also no damage. It is not necessary for synchronization with the starting process to take place. Rather, the depicted "chopped" half-bridge operation ensures near-resonance (0.55 times the resonant frequency) excitation with a corresponding voltage increase across the lamp. In the present case, as is shown in FIG. 3, voltage amplitudes across the lamp of almost ±400 V result. This excitation takes place with the AC voltage illustrated at channel 2 at the bridge center point. Not only the "chopper operation" of the lower switching transistor $S_2$ but also, in the switching phases therebetween, the "chopper operation" of the upper switching transistor $S_1$ can be seen there. It can also be seen that in each case only the first two gate voltage drops have an influence on the voltage at the bridge center point. This is associated with the freewheeling diodes which can be seen in FIG. 1 and which are connected in parallel with the switching transistors $S_1$ and $S_2$. Depending on the sign of the inductor current through the inductor $L_1$, the latter carry the current such that the modulation of the gate voltage remains without effect.

Typical resonant frequencies are approximately 20 kHz–40 kHz. In the present case, the effective total capacitance of the filter capacitors is 100 nF, and the inductance of the inductor $L_1$ is 500 μH. The fundamental excitation frequency is 12.5 kHz, and the resonant frequency is approximately 22.5 kHz.

It can be seen from the lamp voltage on channel 3 that, at the transition from the conductive switching phase of one switching transistor to the conductive switching phase of the other switching transistor, approximately a sinusoidal cycle of the lamp voltage begins. In this case, the two shoulders between the extreme values of the lamp voltage correspond to the start and to the end of such sinusoidal cycles, i.e. approximately to the extremes of the individual sinusoidal period. They are step responses to the resonance excitation as a result of the excitation frequency which is markedly lower than the resonant frequency. In this case, the lamp voltage oscillates at double the excitation amplitude and would then carry out a sinusoidal oscillation about the excitation amplitude, of which, however, only a first section can be seen. This is based precisely on the ratio, which approximately corresponds to the number 2, between the excitation frequency and the resonant frequency.

The level of the transfer voltage can thus be set firstly by selecting the excitation frequency, secondly by the "chopper operation", and thirdly naturally by the temporal length of the conductive phases of the switching transistors.

FIG. 3 shows the fact that the "chopper frequency" corresponds approximately to eight times the fundamental excitation frequency. In this case, a duty cycle is achieved within the modulation frequency, i.e. a ratio between the switch-on phase and the associated switch-off phase by "chopping" of approximately 85% (the duty cycle is only based on the modulation and not on the basic clocking).

The invention claimed is:

1. An electronic ballast for powering a high-pressure discharge lamp (Lp), the ballast comprising:
    a half-bridge inverter (S1,S2,C4,C5) adapted to receive an intermediate circuit voltage (U1) provided between first and second supply branches, and operable to provide an alternating inverter output voltage having a fundamental frequency, the half-bridge inverter including first and second inverter switches (S1,S2);
    a resonant circuit (L1,C1,C2,C3) coupled to the inverter, the lamp, and the first and second supply branches, the resonant circuit having a resonant frequency; and
    a starting circuit (G1) coupled between the resonant circuit and the lamp, and operable to provide a high voltage starting pulse for igniting the lamp during a starting phase;
    wherein the inverter and resonant circuit are further operable such that:
        (a) during at least a transfer phase following the starting phase but preceding a continuous operation phase, the inverter operates at a first fundamental frequency that is substantially less than the resonant frequency of the resonant circuit, whereby the inverter and the resonant circuit operate during the transfer phase to provide a lamp voltage across the lamp that is characterized by having: (i) a peak amplitude that is distinctly greater than one half of the intermediate circuit voltage, but substantially lower than the peak amplitude of the high voltage starting pulse; and (ii) a substantially sinusoidal waveshape having a substantially zero average value; and
        (b) during the continuous operation phase following completion of the transfer phase, the inverter operates at a second fundamental frequency that is substantially lower than the first fundamental frequency, whereby the inverter and the resonant circuit operable to provide a lamp voltage across the lamp that is characterized by having: (i) a peak amplitude that is distinctly less than one half of the intermediate circuit voltage; and (ii) a substantially squarewave waveshape having a substantially zero average value.

2. The electronic ballast of claim 1, wherein:
    the first fundamental frequency is between about 0.4 times the resonant frequency and about 0.6 times the resonant frequency; and
    the peak amplitude of the lamp voltage is: (i) during the transfer phase, between about 80 volts and about 150 volts; and (ii) during the continuous operation phase, between about 260 volts and about 330 volts.

3. The electronic ballast of claim 1, wherein the inverter is further operable such that, during the transfer phase, the inverter also operates as a step-down converter wherein, within each half-cycle of the inverter output voltage, one of the first and second inverter switches is commutated at a first chopper frequency that is substantially greater than the first fundamental frequency.

4. The electronic ballast of claim 3, wherein the first chopper frequency is about 8 times the first fundamental frequency.

5. The electronic ballast of claim 1, wherein the inverter is further operable such that, during the continuous operation phase, the inverter also operates as a step-down converter wherein, within each half-cycle of the inverter output voltage, one of the first and second inverter switches is commutated at a second chopper frequency that is substantially greater than the second fundamental frequency.

6. The electronic ballast of claim 1, wherein the inverter operates at the first fundamental frequency during both the starting phase and the transfer phase.

* * * * *